US009990012B2

(12) United States Patent
Moore et al.

(10) Patent No.: US 9,990,012 B2
(45) Date of Patent: Jun. 5, 2018

(54) DISC DRIVE MODULE

(71) Applicant: HEWLETT PACKARD ENTERPRISE DEVELOPMENT LP, Houston, TX (US)

(72) Inventors: Earl W Moore, Cypress, TX (US); Minh H Nguyen, Katy, TX (US); David A Selvidge, Cypress, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days. days.

(21) Appl. No.: 15/120,506

(22) PCT Filed: Apr. 24, 2014

(86) PCT No.: PCT/US2014/035280
§ 371 (c)(1),
(2) Date: Aug. 19, 2016

(87) PCT Pub. No.: WO2015/163882
PCT Pub. Date: Oct. 29, 2015

(65) Prior Publication Data
US 2017/0010641 A1    Jan. 12, 2017

(51) Int. Cl.
*G06F 1/16* (2006.01)
*H05K 7/16* (2006.01)
(Continued)

(52) U.S. Cl.
CPC .............. *G06F 1/187* (2013.01); *G11B 33/02* (2013.01); *G11B 33/022* (2013.01); *G11B 33/128* (2013.01)

(58) Field of Classification Search
CPC ....... G06F 1/187; G11B 33/02; G11B 33/022; G11B 33/128
(Continued)

(56) References Cited

U.S. PATENT DOCUMENTS 5,602,717 A * 2/1997 Leshem .............. G06F 13/4081
361/679.34
5,896,273 A    4/1999 Varghese
(Continued)

FOREIGN PATENT DOCUMENTS

| EP | 0898219 | 2/1999 | |
|---|---|---|---|
| EP | 0898219 A1 * | 2/1999 | ............. G06F 1/184 |
| WO | WO-2013066312 | 5/2013 | |

OTHER PUBLICATIONS

Fujitsu; Different Disk Drives in the Same Drive Enclosure; http://www.fujitsu.com/global/services/computing/storage/eternus/products/diskstorage/feature/strsys-c11.html; Jun. 3, 2011.
(Continued)

*Primary Examiner* — Nidhi Thaker
(74) *Attorney, Agent, or Firm* — Hewlett Packard Enterprise Patent Department (57) ABSTRACT

A disk drive module is provided herein. The disk drive module includes a frame, a keyed member, a front aperture, and a back aperture. The frame includes a top wall, a bottom wall, and a pair of side walls therebetween. The keyed member is formed along at least one of the pair of side walls. The front aperture to receive a drive carrier. The back aperture to interchangeably receive at least one back end selected from a hot plug back end and a non-hot plug back end.

18 Claims, 9 Drawing Sheets

(51) Int. Cl.
*G06F 1/18* (2006.01)
*G11B 33/02* (2006.01)
*G11B 33/12* (2006.01)

(58) Field of Classification Search
USPC ........................ 361/679.31–679.39, 724–727
See application file for complete search history.

(56) References Cited

U.S. PATENT DOCUMENTS

| | | |
|---|---|---|
| 6,351,375 B1 | 2/2002 | Hsieh et al. |
| 2003/0009700 A1 | 1/2003 | Emberty |
| 2004/0088457 A1 | 5/2004 | Burns |
| 2004/0257760 A1* | 12/2004 | Record .............. G11B 33/022 361/679.32 |
| 2006/0056146 A1* | 3/2006 | Marcade .............. G06F 1/187 361/679.32 |
| 2009/0279244 A1 | 11/2009 | Crippen et al. |
| 2011/0090637 A1* | 4/2011 | Hiyama .............. G06F 1/187 361/679.33 |
| 2013/0127310 A1* | 5/2013 | Yu .............. G06F 1/187 312/223.2 |

OTHER PUBLICATIONS

PCT/ISA/KR, International Search Report ISRWROP, dated Jan. 14, 2015, PCT/US2014/035280 11 pps.

* cited by examiner

DISC DRIVE MODULE

BACKGROUND

Computing systems include hard disk drives. The hard disk drives are typically attached to a hard disk drive carrier then inserted into a computing system. For example, a hard disk drive is attached to a hard disk drive carrier and then inserted into a shelf in a computing system where it is connected to other electronic components.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

In the following detailed description, reference is made to the accompanying drawings which form a part hereof, and in which is depicted by way of illustration specific examples in which the present disclosure may be practiced. It is to be understood that other examples may be utilized and structural or logical changes may be made without departing from the scope of the present disclosure.

Computing system designs determine requirements for components in the computing system. Space, thermal constraints, cost, and ease of use are some factors that determine the type of hard disk drive carriers that are used in a specific computing system.

In examples, a disk drive module is provided. The disk drive module includes a frame, a keyed member, a front aperture, and a back aperture. The frame includes a top wall, a bottom wall, and a pair of side walls therebetween. The keyed member is formed along at least one of the pair of side walls. The front aperture to receive a drive carrier. The back aperture to interchangeably receive at least one back end selected from a hot plug back end and a non-hot plug back end.

The disk drive module provides a single cage with a back end aperture that interchangeably receives back ends to enable the cage to accept a hot pluggable disk drive carrier and/or a non-hot pluggable disk drive carrier. The disk drive module reduces costs by allowing for the manufacture of a single disk drive module instead of separate disk drive modules for a multiple types of disk drives. The disk drive module uses interchangeable back ends to provide quick and easy changes to the disk drive module to accommodate a variety of disk drives, such as both a hot pluggable disk drive carrier and a non-hot pluggable disk drive carrier. Moreover, the back end and the keyed member of the drive cage are formed to engage with a compatible drive carrier when the drive carrier is inserted therein.

The phrase "disk drive" refers to a device to read data from and write data to a disk. For example, a hard disk drive uses a program to read data from and write data to a disk.

The terms "hot plug" and "hot pluggable" refer to components that may be replaced and/or added to a system with minimal interruption to the operation of the system. For example, component, such as a hot pluggable disk drive, may be plugged-in (added) to the system or unplugged (removed) from the system without rebooting the operating system.

The terms "non-hot plug" and "hot pluggable" refer to components that do not meet the definition of hot plug or hot pluggable.

The phrase "hot plug back end" refers to a portion of a disk drive module and/or a drive cage compatible with a hot pluggable disk drive.

The phrase "non-hot plug back end" refers to a portion of a disk drive module and/or a drive cage compatible with a non-hot pluggable disk drive.

Figure 1:
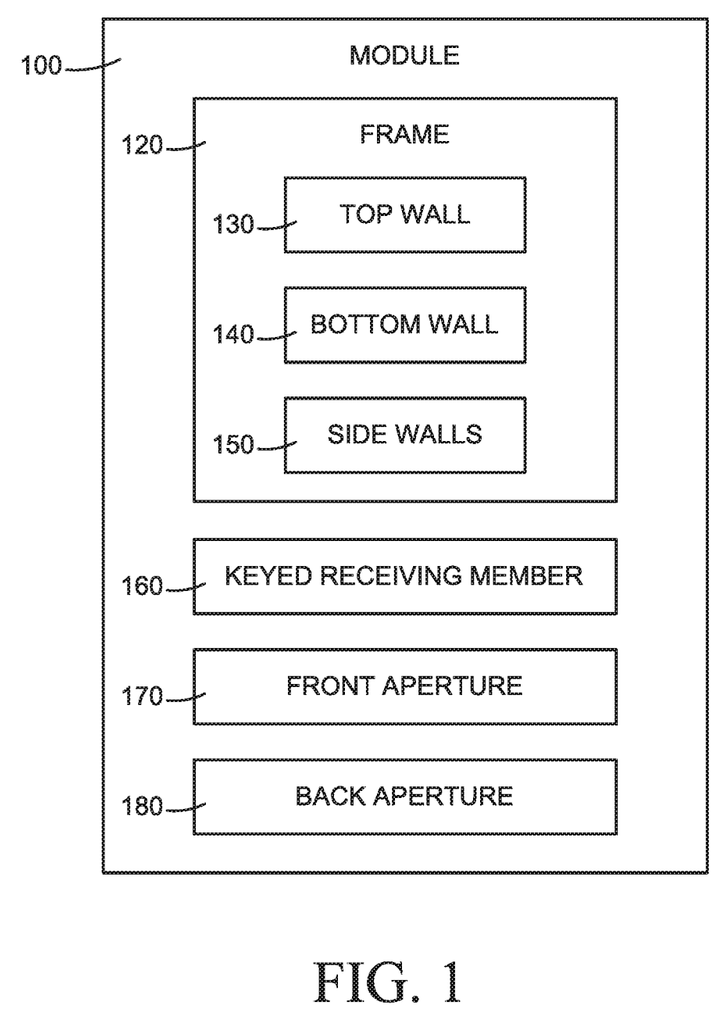
FIG. 1 illustrates a block diagram of a disk drive module according to an example.

FIG. 1 illustrates a block diagram of a disk drive module 100 according to an example. The disk drive module 100 includes a frame 120, a keyed member 160, a front aperture 170, and a back aperture 180. The frame 120 includes a top wall 130, a bottom wall 140, and a pair of side walls 150 therebetween. The keyed member 160 is formed along at least one of the pair of side walls 150. The front aperture 170 to receive a drive carrier. The back aperture 180 to interchangeably receive at least one back end selected from a hot plug back end and a non-hot plug back end.

Figure 2:
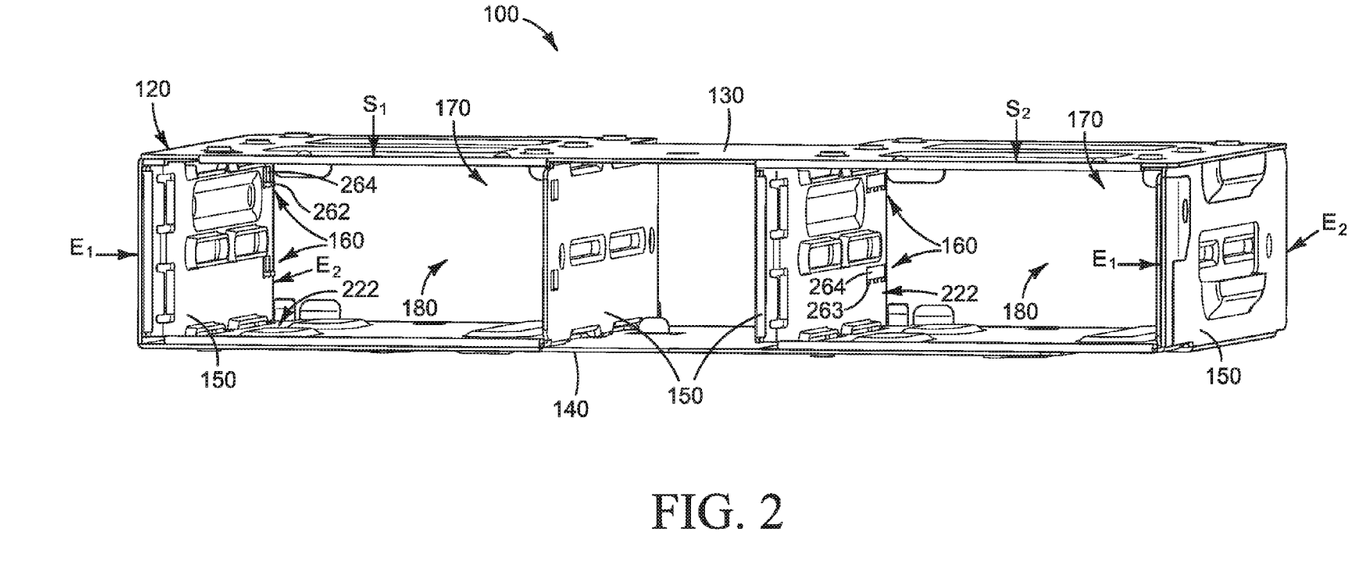
FIG. 2 illustrates an isometric view of the disk drive module of FIG. 1 according to an example.

FIG. 2 illustrates an isometric view of the disk drive module 100 of FIG. 1 according to an example. The disk drive module 100 includes the frame 120 with the top wall 130 and the bottom wall 140 approximately parallel to one another, and two pairs of side walls 150 approximately parallel to one another and approximately perpendicular to the top wall 130 and the bottom wall 140. The disk drive module 100 illustrated is formed to receive four disk drive carriers through the front aperture 170. The front aperture 170 is illustrated on a first end $E_1$ of the pair of side walls 150.

The pair of side walls 150 includes a keyed member 160. For example, four keyed members 160 are illustrated to mate with four drive carriers that connect to the frame 120. The keyed members 160 may be formed in, extend from, or attached to at least one of the pair of side walls 150. For example, the keyed member 160 may include a keyed protrusion 262 extending from at least one of the pair of side walls 150. The keyed protrusion 262 may include, for example, a bump, a projection, a ridge, or a plurality of keyed protrusions. For example, the front aperture 170 on one side, $S_1$, of FIG. 2 includes a keyed protrusion 262. The keyed member 160 may further or alternatively include a keyed aperture 264 formed in the at least one of side walls 150. For example, the other side, $S_2$, of FIG. 2 includes a keyed aperture 264 adjacent to the keyed protrusion 262 illustrated as a plurality of the keyed protrusions 263. The keyed aperture 264 is illustrated as a portion, such as a square, of the side wall removed from the at least one of the pair of side walls 150. The keyed member 160 to provides compatibility with, or example, both hot plug and non-hot pluggable disk drive carriers.

The back aperture 180 is illustrated at a second end $E_2$ of the pair of side walls 150 opposite the first end, $E_1$. The back aperture 180 to receive a back end. The back end to engage with at least one of the top wall 130, the bottom wall 140, and one of the pair of side walls 150, which may interchangeably receive a plurality of back ends, such as a back end for a hot pluggable disk drive and a back end for a non-hot pluggable disk drive. For example, the engagement may be formed between a carrier engagement surface 222 that mates with the at least one back end. Referring to FIG. 2, the one side, S1, may include the carrier engagement surface 222 on the bottom wall 140 and/or the top wall 130. Conversely, the other side, S2, may include the carrier engagement surface 222 on the pair of side walls 150. The interchangeability of the back ends provide the ability to change the arrangement of the disk drive module between hot pluggable disk drives and non-hot pluggable disk drives by simply changing the back ends.

Figure 3:
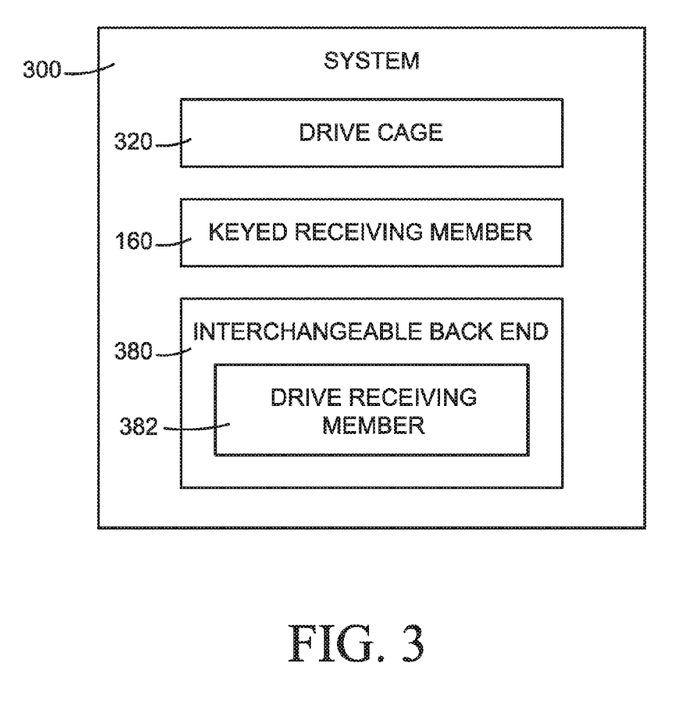
FIG. 3 illustrates a block diagram of a system according to an example.

FIG. 3 illustrates a block diagram of a system 300 according to an example. The system 300 includes a drive cage 320, a keyed member 160, and an interchangeable back end 380. The drive cage 320 to receive a drive carrier. The keyed member 160 connected to the drive cage 320 to mate with the drive carrier. The interchangeable back end 380 to connect to the drive cage 320. The interchangeable back end 380 including a drive receiving member 382 to accept a compatible drive carrier.

Figure 4:
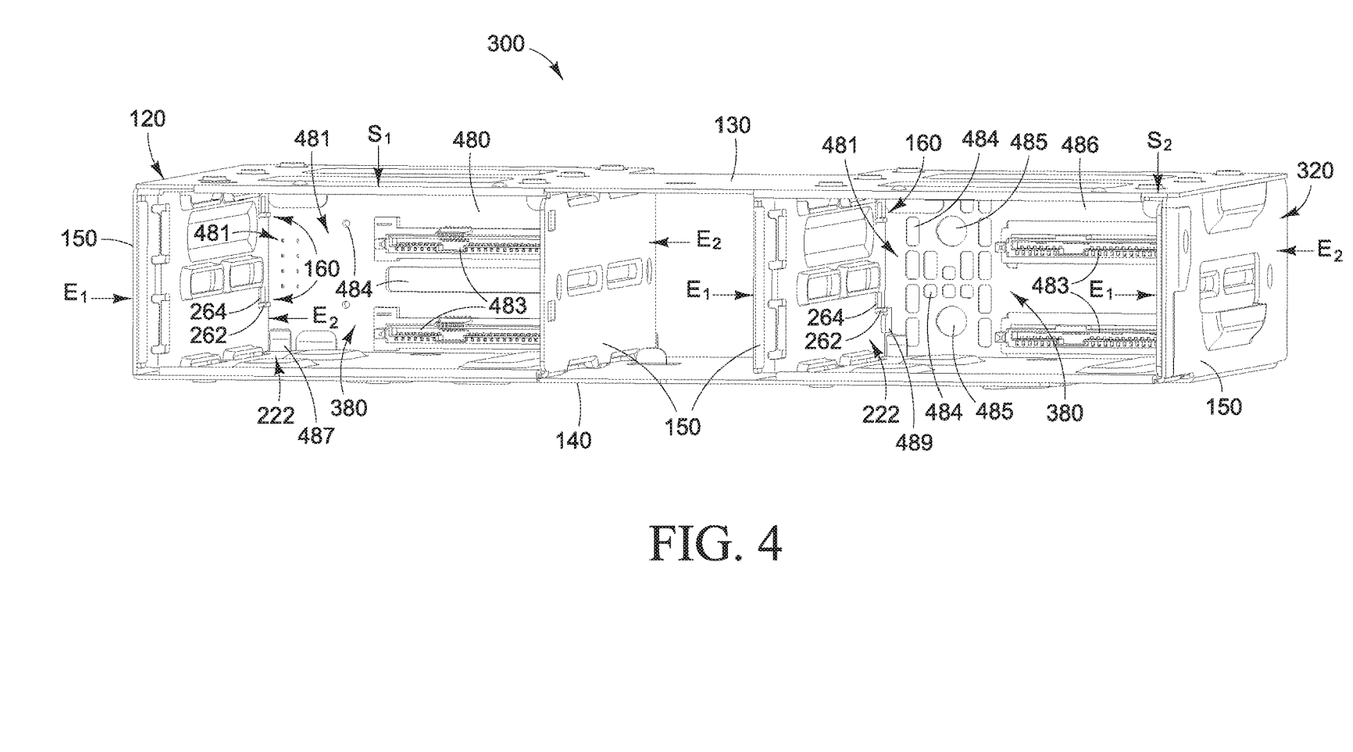
FIG. 4 illustrates an isometric view of the system of FIG. 3 according to an example.

FIG. 4 illustrates an isometric view of the system 300 of FIG. 3 according to an example. The system 300 includes the drive cage 320, the keyed member 160, and the interchangeable back end 380. The drive cage 320 may be formed of a frame, such as the frame 120 illustrated in FIG. 2 that includes a top wall 130 and a bottom wall 140 approximately parallel to one another, and a pair of side walls 150 therebetween. The pair of side walls 150 are positioned approximately parallel to one another and approximately perpendicular to the top wall 130 and the bottom wall. At least one of the pair of side walls 150 includes a keyed member 160.

The keyed member 160 may be formed in, extend from or attached to at least one of the pair of side walls 150. For example, the keyed member 160 includes a keyed protrusion 262 extending from or attached to at least one of the pair of side walls 150. The keyed protrusion 262 may include, for example, a bump, a projection, a ridge, or a plurality of protrusions. Alternatively or in addition thereto, the keyed member 160 may include a keyed aperture 264 or a keyed groove formed into at least one of the pair of side walls 150. For example, at least one side wall of the pair of side walls 150 may include the keyed aperture 264 removed from the side wall and/or a keyed groove or channel formed therein.

The drive cage 320 may further include a front aperture 170 to receive the drive carrier, and a back aperture 180 to accept the interchangeable back end 380. The interchangeable back end 380 includes a drive receiving member 382 to accept a compatible drive carrier. The drive receiving member 382 may include a drive aperture 485 to receive a portion of a drive carrier. The drive receiving member 382 may further include an engagement member 487 to mate with a portion of the drive carrier. The interchangeable back end 380 may also include a drive stop 489 to prevent insertion of a non-compatible drive carrier.

For example, the one side, $S_1$ of the drive cage 320 may include a hot plug back end 480. The hot plug back end 480 is formed of a planar member 481 with ports 483 to receive a hot pluggable disk drive. The hot plug back end 480 may also include additional openings or apertures 484 for accessing, connecting, and/or thermal control of the disk drive. The hot plug back end 480 may further include an engagement member 487, such as a bracket or clamp that connects to at least one of the top wall 130, the bottom wall 140, and one of the pair of side walls 150.

The other side, $S_2$, of the drive cage 320 may include a non-hot plug back end 486 formed of a planar member 481 with ports 483 to receive a non-hot pluggable disk drive. The non-hot plug back end 486 includes a drive aperture 485 to receive a portion of the drive carrier. The non-hot plug back end 486 may also include additional openings or apertures 484 for accessing, connecting, and/or thermal control of the disk drive. The non-hot plug back end 486 may also include a drive stop 489 to prevent insertion of a hot plug back end 480 into the non-hot pluggable disk drive 486. The drive stop 489 may include, for example, a set of hooks extending from the planar member 481 and aligning with the pair of side walls 150

Figure 5A:
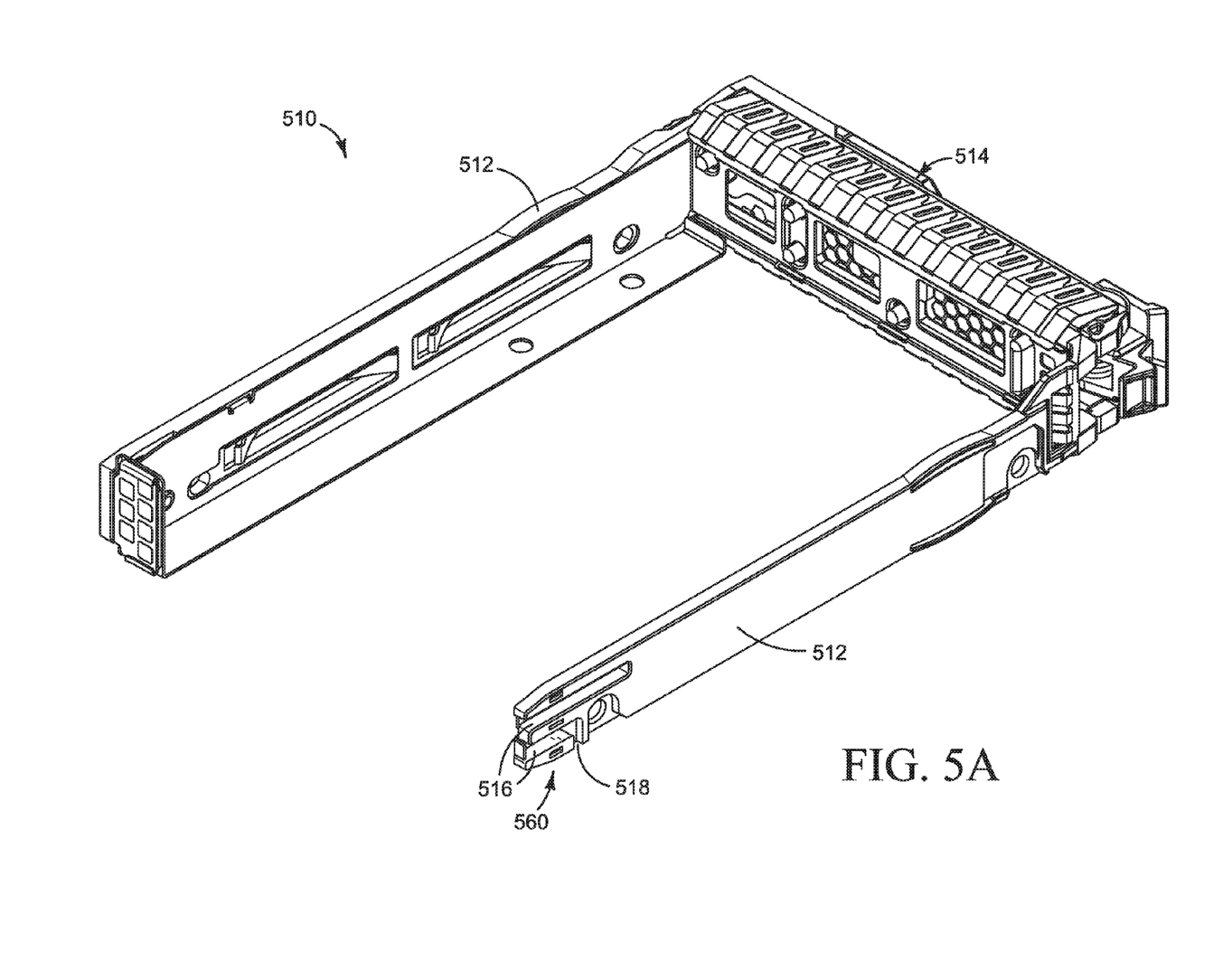
FIGS. 5A-5B illustrate isometric views of drive carriers usable with the system f FIG. 3 according to an example.
Figure 5B:
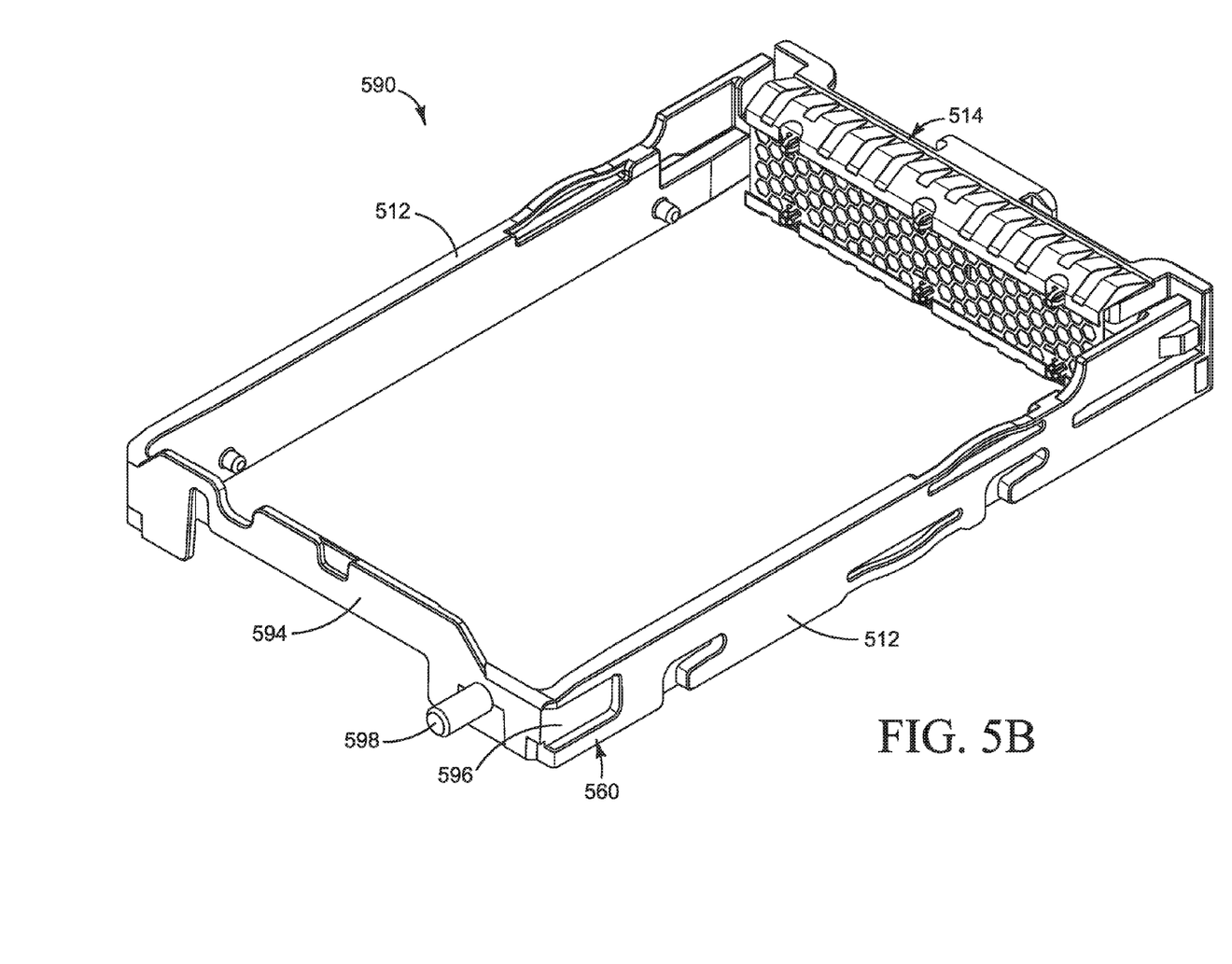

FIGS. 5A-5B illustrate isometric views of drive carriers usable with the system of FIG. 3 according to an example. FIG. 5A illustrates a hot pluggable disk drive carrier 510 according to an example. The hot pluggable disk drive carrier 510 includes a pair of carrier side support members 512 and a carrier front panel 514 formed therebetween. The hot pluggable disk drive carrier 510 to receive and hold the hot pluggable disk drive therein. The hot pluggable disk drive carrier 510 further includes a drive key 560. The drive key 560 is illustrated on one of the pair of side carrier walls 512 as a pair of carrier grooves 516 approximately parallel to one another with one of the pair of carrier grooves 516 having a perpendicular groove 518 extending therefrom. The carrier groove 596 to mate with the keyed member 160 on the drive cage 320.

Referring to FIG. 5B, a non-hot pluggable disk drive carrier 590 is illustrated. The non-hot pluggable disk drive carrier 590 includes a pair of carrier side support members 512, a carrier front panel 514, and a carrier back support member 594. The non-hot pluggable disk drive carrier 590 includes a drive key 560 to mate with the keyed member 160 of the drive cage 320. The drive key 560 is illustrated as a single carrier groove 596 or channel member on one of the pair of carrier side support members 592. The carrier groove 596 to mate with the keyed member 160 on the drive cage 320. The non-hot plug carrier 590 further includes a carrier protrusion 598 extending therefrom. When inserted into the drive cage 320, the carrier protrusion 598 extends from the non-hot pluggable disk drive carrier 590 towards the interchangeable back end 380 or back aperture 180. The carrier protrusion 598 enables insertion of the non-hot pluggable disk drive carrier 590 only when the correct back end is installed, the non-hot plug back end 486 which has the drive aperture 485.

Figure 6:
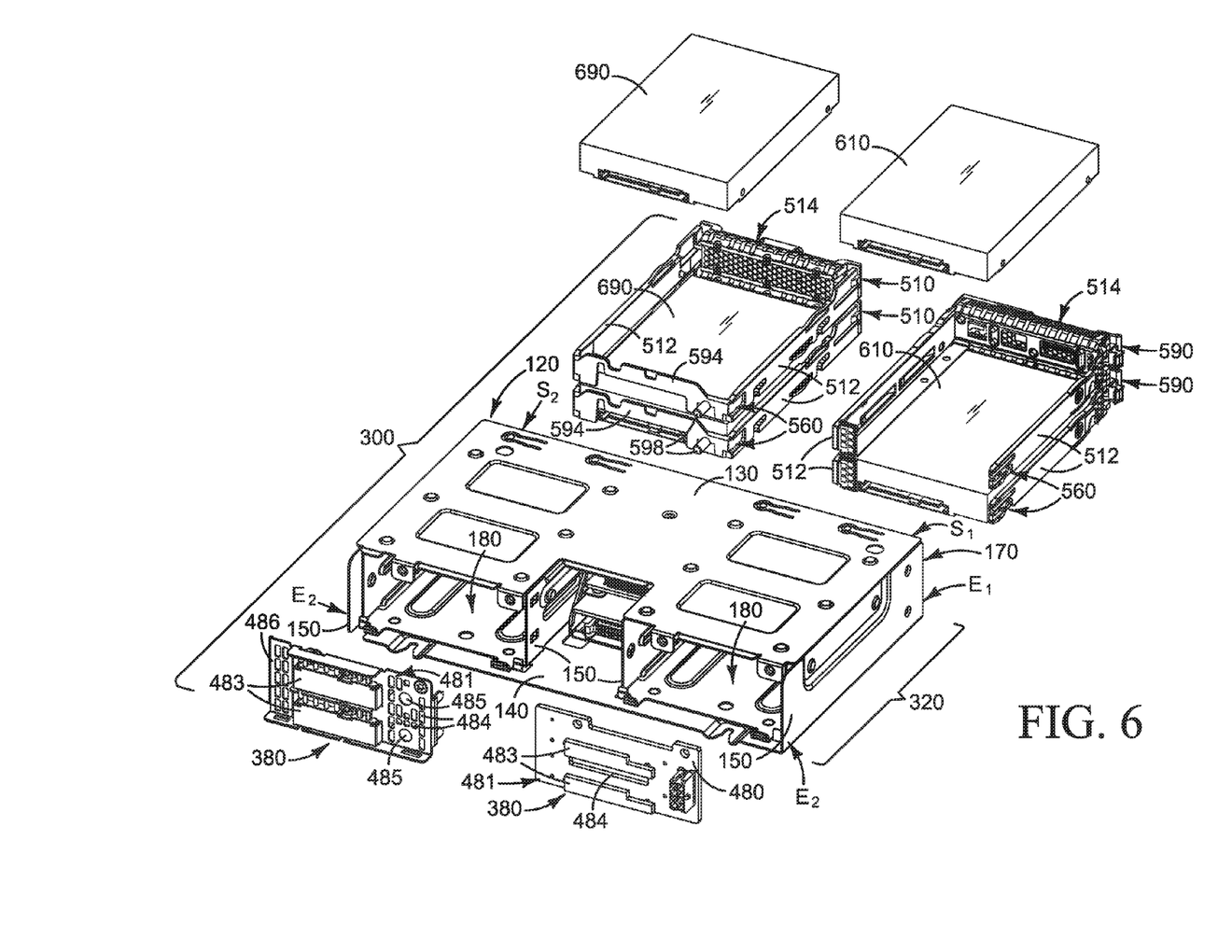
FIG. 6 illustrates an exploded view of the back of the system of FIG. 3 according to an example.
Figure 7:
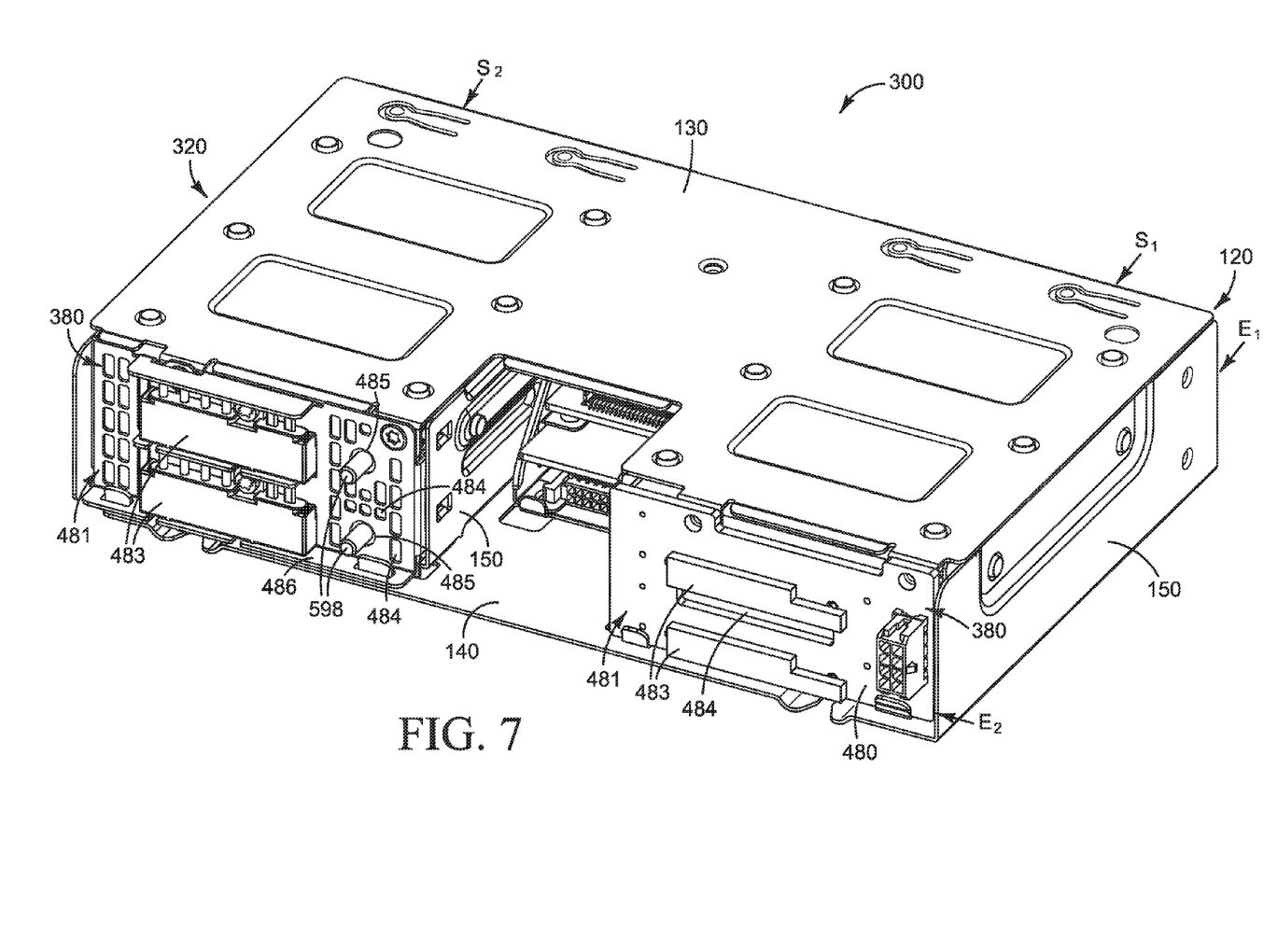
FIG. 7 illustrates an assembled view of the back of the system of FIG. 3 according to an example.

FIG. 6 illustrates an exploded view of the back of the system 300 of FIG. 3 according to an example. FIG. 7 illustrates an assembled view of the back of the system 300 of FIG. 3 according to an example. The system 300 includes the drive cage 320, the keyed member 160, and an interchangeable back end 380. The system 300 is further illustrated to include a drive carrier that is compatible with the back ends connected to the drive cage 320.

For example, the one side. $S_1$, of the drive cage 320 includes a back view of the hot plug back end 480 with a hot pluggable disk drive carrier 510 holding a hot pluggable hard disk drive. The hot pluggable disk drive carrier 510 is aligned such that the drive cage 320 may receive the hot pluggable disk drive carrier 480 holding the hot pluggable hard disk drive 610. The hot plug back end 480 may be prevented from fitting into the non-hot plug back end 486 due to the design of the back ends and drive carriers. For example, the non-hot plug back end 486 may include a drive stop 489, as illustrated and describe in FIG. 4, to prevent insertion of a hot plug back end 480 into the non-hot pluggable disk drive 486.

Similarly, the other side, S$_2$, of the drive cage 320 includes a back view of the non-hot plug back end 486 with a non-hot pluggable disk drive carrier 590. The non-hot pluggable disk drive carrier 590 includes a non-hot pluggable hard disk drive 690. The non-hot pluggable disk drive carrier 590 is aligned such that the drive cage may receive the non-hot pluggable disk drive carrier 590 and non-hot pluggable hard disk drive 690. The non-hot pluggable disk drive carrier 590 includes a cylindrical portion that extends therefrom, towards the back aperture. The cylindrical portion may form the carrier protrusion 598. The cylindrical portion extends through the drive aperture 485 on the non-hot plug back end 486 and prevents the non-hot pluggable disk drive carrier 590 from being inserted into the one side, S$_1$, of the drive cage 320 with the hot plug back end 480, which does not include the drive aperture 485.

Figure 8:
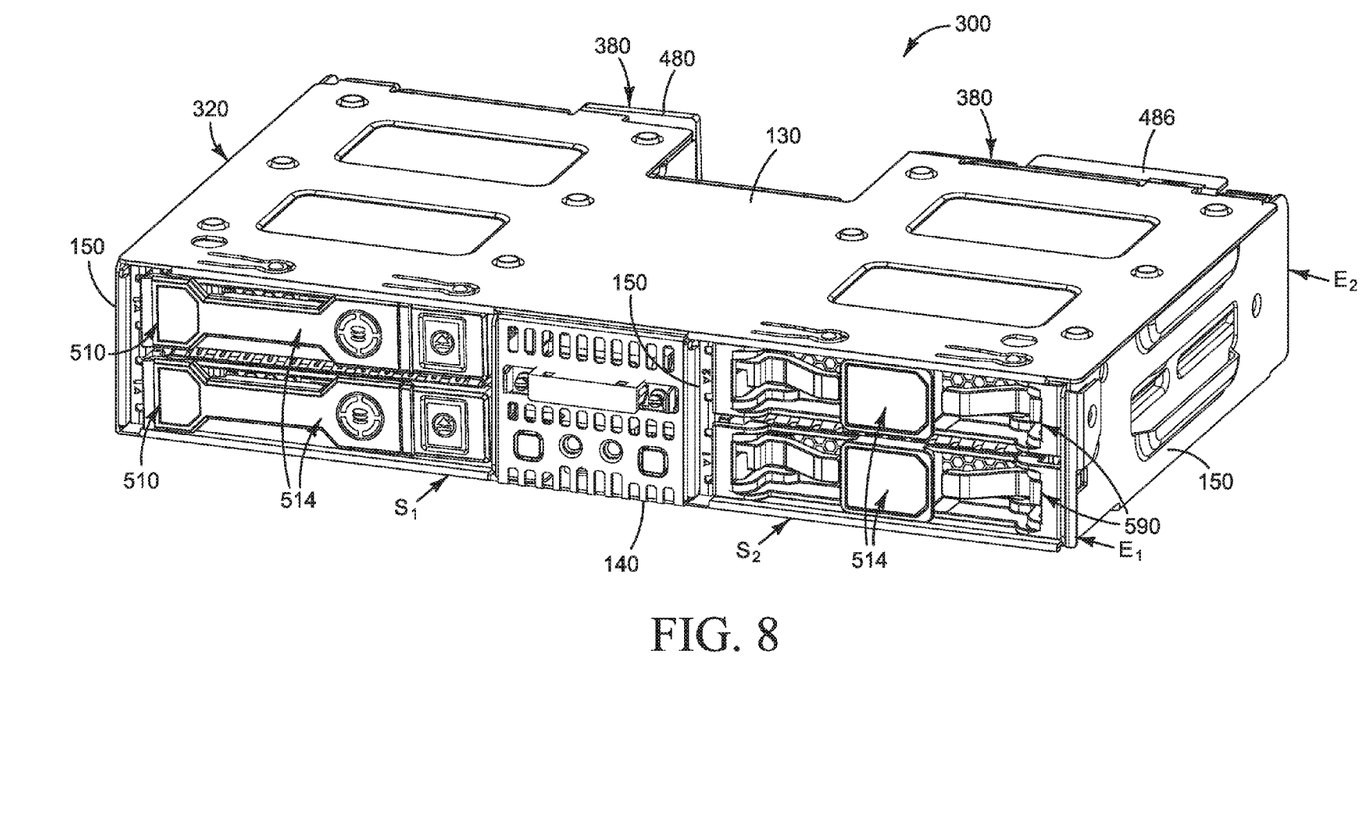
FIG. 8 illustrates an assembled view of the front of the system of FIG. 3 according to an example.

FIG. 8 illustrates an assembled view of the front of the system 300 of FIG. 3 according to an example. The system 300 illustrates an example of the drive cage 320 as a front loading drive cage; however, the drive cage 320 may include other types of drive cages, such as a top loading drive cage that may receive a top loading disk drive or cartridge. The one side, S$_1$, of the drive cage 320 includes two hot pluggable disk drive carriers 510 with hot pluggable hard disk drives 610 each inserted into a slot of the drive cage 320. The other side, S$_2$, of the drive cage 320 includes two non-hot pluggable disk drive carriers 590 with non-hot pluggable hard disk drives 690 each inserted into a slot of the drive cage 320.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be exemplary. Structure and acts described herein are replaceable by equivalents, which perform the same function, even if the structure or acts are different, as known in the art. Therefore, the scope of the present disclosure is limited only by the elements and limitations as used in the claims.

What is claimed is:

1. A disk drive module comprising: a frame including a top wall, a bottom wall, and a pair of side walls therebetween; a keyed member formed along at least one of the pair of side walls, the keyed member includes a keyed aperture adjacent to a keyed protrusion both formed along the same side wall of the at least one of the pair of side walls; a front aperture to receive a drive carrier; and a back aperture to interchangeably receive at least one back end selected from a hot plug back end and a non-hot plug back end; wherein the drive carrier includes a drive key to mate with the keyed member, the drive key includes a pair of carrier grooves approximately parallel to one another with one of the pair of carrier grooves having a perpendicular groove extending therefrom.

2. The disk drive module of claim 1, wherein at least one of the top wall, the bottom wall, and one of the pair of side walls comprises a carrier engagement surface to mate with the at least one back end.

3. The disk drive module of claim 1, wherein the keyed member mates with the drive carrier.

4. The disk drive module of claim 1, wherein the keyed protrusion extending from the at least one of the pair of side walls.

5. A system comprising: a drive cage to receive a drive carrier; a keyed member to mate with the drive carrier; and an interchangeable back end to connect to the drive cage, the interchangeable back end comprises at least one back end selected from a hot plug back end and a non-hot plug back end, the interchangeable back end including a drive receiving member to accept a compatible drive carrier, the compatible drive carrier includes a drive key to mate with the keyed member, the drive key includes a pair of carrier grooves approximately parallel to one another with one of the pair of carrier grooves having a perpendicular groove extending therefrom.

6. The system of claim 5, wherein the drive cage comprises a top wall, a bottom wall, and a pair of side walls therebetween.

7. The system of claim 5, wherein the keyed member comprises a keyed protrusion.

8. The system of claim 5, wherein the keyed member comprises a keyed aperture.

9. The system of claim 5, wherein the keyed member comprises a keyed groove.

10. The system of claim 5, wherein the drive receiving member comprises an aperture to receive a portion of the compatible drive carrier.

11. The system of claim 5, wherein the drive receiving member comprises an engagement member to mate with a portion of the compatible drive carrier.

12. The system of claim 5, wherein the interchangeable back end comprises a drive stop to prevent insertion of a non-compatible drive carrier.

13. A system comprising: a drive cage to receive a drive carrier including a top wall, a bottom wall, and a pair of side walls therebetween; a keyed member to mate with the drive carrier, the keyed member formed along at least one of the pair of side walls, the keyed member includes a keyed aperture adjacent to a plurality of keyed protrusions, both the keyed member and keyed protrusions are formed along the same side wall of the at least one of the pair of side walls; and an interchangeable back end to connect to the drive cage, the interchangeable back end comprises at least one back end selected from a hot plug back end and a non-hot plug back end, the interchangeable back end including a drive receiving member to accept a compatible drive carrier, the compatible drive carrier includes a drive key to mate with the keyed member, the drive key includes a pair of carrier grooves approximately parallel to one another with one of the pair of carrier grooves having a perpendicular groove extending therefrom.

14. The system of claim 13, wherein the keyed member comprises a keyed groove.

15. The system of claim 13, wherein the drive receiving member comprises an aperture to receive a portion of the compatible drive carrier.

16. The system of claim 13, wherein the drive receiving member comprises an engagement member to mate with a portion of the compatible drive carrier.

17. The system of claim 13, wherein the interchangeable back end comprises a drive stop to prevent insertion of a non-compatible drive carrier.

18. The system of claim 13, wherein at least one of the top wall, the bottom wall, and one of the pair of side walls comprises a carrier engagement surface to mate with the at least one back end.

* * * * *